(12) United States Patent
Chamandy et al.

(10) Patent No.: US 10,176,353 B2
(45) Date of Patent: Jan. 8, 2019

(54) METHOD AND SYSTEM OF FORENSIC ENCRYPTION

(71) Applicant: AVERY DENNISON RETAIL INFORMATION SERVICES, LLC, Westborough, MA (US)

(72) Inventors: Paul A. Chamandy, Ithaca, NY (US); David O'Connell, Cork (IE)

(73) Assignee: AVERY DENNISON RETAIL INFORMATION SERVICES, LLC, Mentor, OH (US)

( * ) Notice: Subject to any disclaimer, the term of this patent is extended or adjusted under 35 U.S.C. 154(b) by 95 days.

(21) Appl. No.: 15/277,459

(22) Filed: Sep. 27, 2016

(65) Prior Publication Data

US 2017/0091505 A1 Mar. 30, 2017

Related U.S. Application Data

(60) Provisional application No. 62/233,669, filed on Sep. 28, 2015.

(51) Int. Cl.
*G06K 7/10* (2006.01)
*G06K 7/14* (2006.01)
(Continued)

(52) U.S. Cl.
CPC ........... *G06K 7/1417* (2013.01); *G06K 1/121* (2013.01); *G06K 7/10554* (2013.01);
(Continued)

(58) Field of Classification Search
CPC .............. G06K 7/1417; G06K 7/1434; G06K 19/06037; G06K 19/06046; G06K 19/06056
See application file for complete search history.

(56) References Cited

U.S. PATENT DOCUMENTS 6,457,651 B2 * 10/2002 Paul .................. G06K 19/06028
235/375
7,387,261 B2 * 6/2008 Onishi ............... H04N 1/32203
235/487
(Continued)

FOREIGN PATENT DOCUMENTS

| EP | 1605396 | 12/2005 |
|----|---------|---------|
| WO | 2015067725 | 5/2015 |
| WO | 2015092694 | 6/2015 |

OTHER PUBLICATIONS

International Search Report and Written Opinion of ISA/EPO dated Dec. 21, 2016, prepared for International Application No. PCT/US2016/053929.

*Primary Examiner* — Thien M Le
*Assistant Examiner* — April Taylor
(74) *Attorney, Agent, or Firm* — Avery Dennison Retail Information Services, LLC

(57) ABSTRACT

A system for forensic encryption may be described. This system may include: a 2D barcode pattern comprising a plurality of standard 2D barcode elements printed in a region on a printable surface, and which is affixed to a unique product; and at least one glyph printed within the area of the 2D barcode pattern; wherein the at least one glyph is generated from information identifying the unique product; and wherein the 2D standard barcode elements may be decoded by a first 2D barcode scanner to yield product information, and wherein a second scan is done by a user, to verify if the label in hand corresponds to the glyph shown on screen. In another embodiment, the 2D barcode pattern including the at least one glyph may be decoded by a second 2D barcode scanner to yield different product information.

13 Claims, 7 Drawing Sheets

(51) Int. Cl.
*G06K 1/12* (2006.01)
*G06K 19/06* (2006.01)

(52) U.S. Cl.
CPC ..... *G06K 7/1434* (2013.01); *G06K 19/06037* (2013.01); *G06K 19/06056* (2013.01); *G06K 7/143* (2013.01)

(56) References Cited

U.S. PATENT DOCUMENTS 8,783,571 B2 * 7/2014 Sakahashi ........ G06K 19/06056 235/462.01
2005/0011958 A1 1/2005 Fukasawa et al.

* cited by examiner

200

✕  RECORD FOUND

Serial Number
M4DYD8HQ00239     —204A

202

RESPONSE
Brand
UNITI
Label Type
FOOTWEAR
Qty
272
Art No. #
621453-132
Fty
HH1-7F
Prod Date
03-14
PO No.
44132-18
206A
Size (USA)
9
Size (UK)

SUBMIT

RECORD FOUND ✕

*202* →

\*SET INSPECTION STATUS
- ◯ NOT VALID
- ◯ SUSPECT  ← *214D*
- ◯ AUTHENTIC

\*DO FORENSICS MATCH?
- ◯ YES
- ◯ NO  ← *216D*

OTHER DETAILS ― *218D*

SUBMIT

FIG. 2D

METHOD AND SYSTEM OF FORENSIC ENCRYPTION

BACKGROUND

Two-dimensional or "matrix" barcodes, such as QR codes, are an information storage and transmission technology that represent data in the form of a visible matrix. Typically, a two-dimensional barcode records data information with particular geometric patterns distributed in two-dimensional directions via black and white, or in some cases multicolored, graphic symbols. In most two-dimensional barcode encoding formats, a logical "0" and "1" bit stream of the sort generally adopted in computer systems is utilized to form graphic symbols that correspond to binary representation of text and numerical information. Once formed, the graphic symbols can be read by an image input device or a photoelectric scanning device, such as a dedicated bar code scanner or a smartphone, in order to process the information encoded within the graphic symbol.

Two-dimensional barcodes may commonly be used in a variety of roles, such as product identification, product tracking, anti-counterfeiting, security, and general marketing. Of the two-dimensional bar codes in use, QR codes specifically are popular due to offering a fast read time and a greater storage capacity compared to standard UPC barcodes, and due to the ease with which a person can scan a QR code with a smartphone or other device. Other standards of two-dimensional barcodes that may be used include Aztec Coding, Datamatrix, PDF417, MaxiCode, QR variants like SPARQCode, or color barcode formats like Microsoft's High Capacity Color Barcode (HCCB) encoding format, among other two-dimensional barcode standards.

However, the popularity of the QR code format has some drawbacks when a barcode is desired to be used for security or authentication purposes. With the growth of the technology, and with the growing ubiquitousness of devices configured to scan barcodes, such as smartphones, methods of coding and decoding the QR code have become well known and widely available. As such, in the fields of security and anti-counterfeiting, QR codes generally cannot be used alone in order to authenticate a product, as a counterfeiter may be perfectly capable of decoding a QR code on a particular product, and subsequently generating a valid-seeming QR code to attach to a counterfeit product.

Other 2D barcodes may suffer from the same disadvantages. As a particular 2D barcode design becomes more popular and more accepted by the public, the ability to decrypt the barcode may become available to more members of the public, which may include counterfeiters. This may, in turn, limit the value of the barcode as a security and anti-counterfeiting tool. However, a 2D barcode design that has not become popular with or accepted by the public may be of limited value for any purposes other than as a security and anti-counterfeiting tool, and may even be of limited utility in that role. For example, if a particular 2D barcode design that is used to mark a product does not have a publically-disclosed method of decrypting it, and requires a user to download a proprietary app to decrypt it, few users may bother to download the app or scan the product barcode in order to find out more information about the product.

This means that the company whose products were marked with that particular 2D barcode may have limited ability to track their products after sale by determining which products are being scanned and where. It also means that the company whose products were marked with that particular 2D barcode has a significantly lessened ability to identify counterfeit products by looking for identical product barcodes being scanned in multiple different places. For example, if a product barcode is scanned in New York on Monday, and an identical product barcode is scanned in California on Tuesday, the company may be able to identify at least one of the two products as a counterfeit. However, if users do not elect to scan their products, the company may not learn about the matching barcodes and may not know to take action. As such, using a proprietary barcode format that may not easily be decodable by an end user may not be a desirable solution either.

SUMMARY

According to at least one exemplary embodiment, a system for forensic encryption may be shown and described. This system may include: a 2D barcode pattern having a plurality of standard 2D barcode elements printed in a region on a printable surface, and which is affixed to a unique product; and at least one glyph printed within the area of the 2D barcode pattern which saves space on the surface area on the printable surface. A user may single scan the standard barcode elements 102. The barcode elements 102 deliver back to a user what a glyph or symbol 104 should look like. A second scan is done by a user, for instance by utilizing a user's visionary capabilities, to verify if the label in hand corresponds to the glyph shown on a screen. The present invention contemplates that the at least one glyph can be adjacent to a barcode or even on a side of the label opposite the barcode. In another embodiment of the present invention, an image, separate from the 2D barcode pattern and at least one glyph or symbol is decoded by a first scanner to yield first information, and the 2D barcode pattern including the at least one glyph are decoded by a second scanner to yield second information such that the first information and second information are compared to one another. The first scanner may be a specific, specialized type of reader.

In another exemplary embodiment, a method for printing a forensic-encoded 2D barcode may be described. This method may include storing, in a storage module of a printer, one or more fonts including glyphs to be printed within a forensic-encoded 2D barcode; receiving, from a computer, instructions to print a forensic-encoded 2D barcode including one or more glyphs, said instructions not including the one or more glyphs to be printed; accessing, from the storage module of the printer and using a processor, one or more fonts including glyphs to be printed within a forensic-encoded 2D barcode; selecting, using a processor, one or more glyphs to be added to the forensic-encoded 2D barcode; generating, from said instructions and using a processor, a forensic-encoded 2D barcode including one or more selected glyphs; and printing the forensic-encoded 2D barcode.

BRIEF DESCRIPTION OF THE FIGURES

FIG. 2A is an exemplary embodiment of a product tag lookup system.

FIG. 2D is an exemplary embodiment of a product tag lookup system.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequences of actions described herein can be performed by specific circuits (e.g. application specific integrated circuits (ASICs)) and/or by program instructions executed by at least one processor. Additionally, the sequence of actions described herein can be embodied entirely within any form of computer-readable storage medium such that execution of the sequence of actions enables the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter. In addition, for each of the embodiments described herein, the corresponding form of any such embodiment may be described herein as, for example, "a computer configured to" perform the described action.

Figure 1:
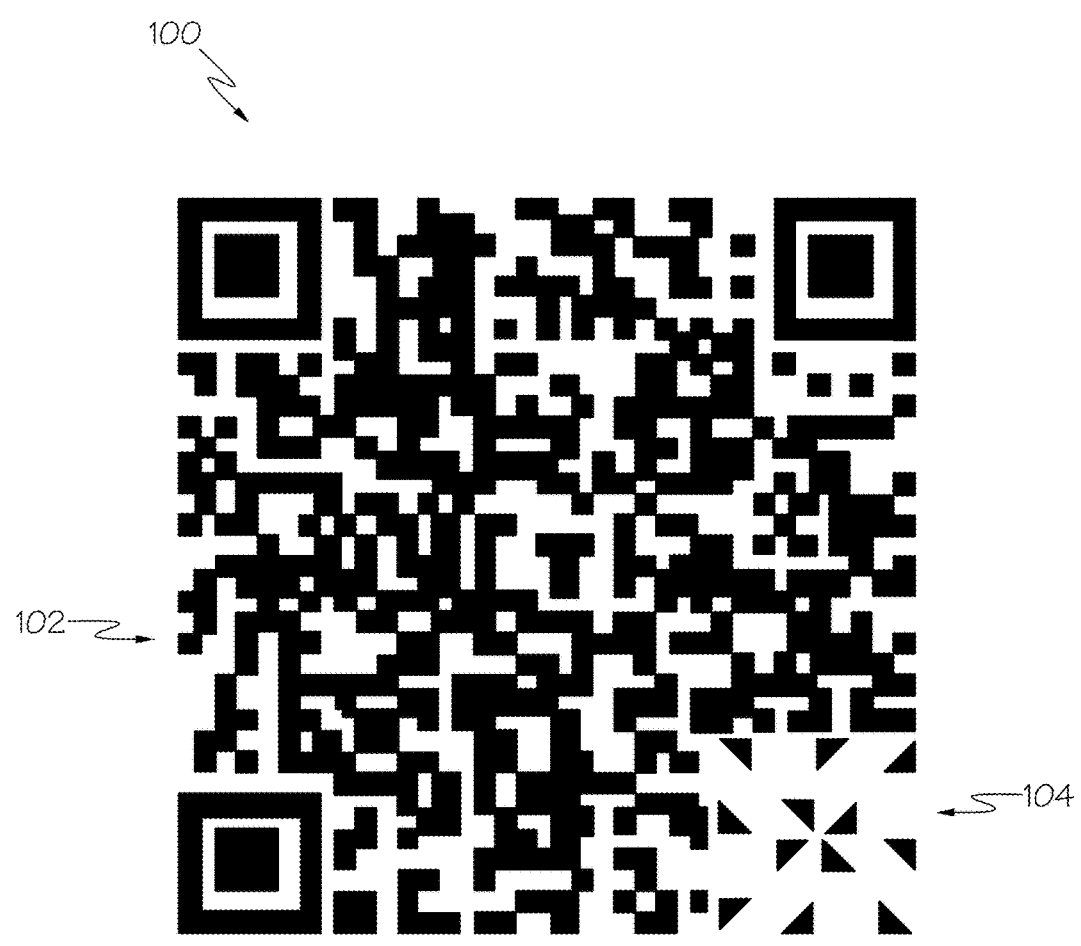
FIG. 1 is an exemplary embodiment of a 2D barcode design including standard barcode elements and an embedded glyph or symbol.

FIG. 1 displays an exemplary embodiment of a 2D barcode design 100 having standard barcode elements 102 and a glyph or symbol 104 embedded within it. For the image illustrated in FIG. 1, a user may single scan the standard barcode elements 102. The barcode elements 102 deliver back to a user what a glyph or symbol 104 should look like. A second scan is done by a user, for instance by utilizing a user's visionary capabilities, to verify if the label in hand corresponds to the glyph shown on screen. According to one exemplary embodiment, the standard barcode elements 102 may utilize an existing standard, and may correspond to any existing 2D barcode format, such as, for example, Aztec Coding, Datamatrix, PDF417, MaxiCode, or QR coding. Color 2D barcode formats, such as Microsoft's High Capacity Color Barcode (HCCB) encoding format, may also be employed. According to an alternative exemplary embodiment, the standard barcode elements 102 may themselves be proprietary and the method of decoding the standard barcode elements 102 may not be disclosed to the public; this may be done, for example, in order to provide a layer of extra security against counterfeiting. According to another alternative exemplary embodiment, a new encoding standard may be developed and may be disclosed to the public.

Glyph or symbol 104 may be any glyph or symbol within a custom alphabet, or may be more than one such glyph or symbol. For example, according to one exemplary embodiment, the symbol may be any symbol within the Latin alphabet or within any other alphabet. According to an alternative exemplary embodiment, the symbol may be any Unicode character or any other character within a computerized alphabet or symbol library. According to a third alternative embodiment, a new or custom set of glyphs or symbols may be developed and used. Other embodiments, including any combinations of the above, may also be used, as desired.

According to an exemplary embodiment, one or more custom fonts may be used to produce the glyphs 104 or other elements of a product tag in which the glyphs 104 may be embedded. For example, according to one exemplary embodiment, a font may be generated that includes graphic symbols, specific letters and numbers and logos, all of which may be scalable. This may allow for a certain amount of flexibility to be inherent in the production process; for example, if the glyphs 104 are stored as part of a font, then it may be easy to scale them up or down to any desired size in order to match the desired size of 2D barcode 100 and provide enough room for the standard barcode information 102. In an embodiment of the present invention in which at least one glyph is placed adjacent to a barcode, the at least one glyph can be placed inconspicuously on a substrate and also saves space on the substrate.

According to an exemplary embodiment, storing the glyphs 104 as part of a font may also increase the security of the glyph encoding process; storing the glyphs 104 as part of a font may allow for the font to be loaded inside of a printer, allowing glyphs 104 to be printed by a manufacturer without requiring that the manufacturer ever have direct access to the glyphs 104 themselves. This may ensure that anyone with physical access to a manufacturer's computer, such as a rogue employee, does not have the ability to access and duplicate the fonts, limiting the ability of a counterfeiter to gain access to the fonts from the manufacturer without directly stealing a printer.

According to an exemplary embodiment, a font storing one or more glyphs 104 may also be pre-loaded onto a printer before product label data is sent to the printer in order to improve printer throughput or glyph 104 image quality. For example, according to an exemplary embodiment, a more precise drawing engine may be present on a printer than on a manufacturer's PC that is associated with the printer; glyph 104 image quality may thus be improved by adding the glyph 104 from a font stored on the printer rather than a font stored in a computer associated with the printer. Such an embodiment may also result in substantially improved glyph 104 image quality in some select circumstances, such as when a glyph 104 is scaled to be smaller or larger, or other circumstances as applicable.

According to an alternative exemplary embodiment, a font storing one or more glyphs 104 may be stored on a computer associated with a printer. Glyph 104 data may be sent to a printer prior to or concurrently with the sending of batch label data to the printer describing a set of product labels to be printed. Smaller or larger batches may be sent to the printer, as desired. For example, smaller batches of product labels being sent to the printer at any one time may allow a particular field of the product label to be varied more often between batches, ensuring a more variable and dynamic final set of product labels. However, sending larger batches may be done instead in order to improve printer throughput. Other advantages may be present in each instance.

Other elements on the product tag, such as the displayed serial number, may also be made using a custom font, and may be paired with the 2D barcode 100 for added security. Custom fonts may have minor yet consistent differences from typical fonts that may serve to distinguish a counterfeit product from an authentic product; for example, according to one exemplary embodiment, a font may be constructed where even numbers and odd numbers are of different heights. According to one exemplary embodiment, the use of a particular glyph 104 may be paired with the use of a particular font for added security; for example, if glyph A is used on a particular product tag, a font may be chosen such that even numbers may be of slightly larger height than odd numbers, while the reverse may be true for glyph B.

Various placements of the glyph 104 within the 2D barcode 100 may be envisioned. For example, according to one exemplary embodiment, a glyph may be placed at an identical, consistent location within the 2D barcode 100 in every variation of the 2D barcode 100, such as in the center-right as depicted in FIG. 1 or in another such location, as desired. According to an alternative exemplary embodiment, glyphs 104 may be placed in alternate locations, or in multiple locations, as desired. According to an exemplary embodiment, otherwise-identical glyphs 104 may be varied within different variations of the 2D barcode 100, which may or may not be used to encode further information. For example, in variations of the 2D barcode 100, a glyph may be rotated 90 degrees, 180 degrees, or 270 degrees, or may be mirrored across the x axis or y axis; each of these variations may encode additional data, if desired. Various rotations or orientations of a glyph or symbol 104 may be utilized, as desired, and may provide desired or enhanced scanning or reading capabilities of the 2D barcode 100 or symbol or glyph 104.

Other attributes of the glyph 104, such as glyph color or glyph size, may also be varied, for example in order to encode information or in order to make the glyph 104 more difficult to copy or reproduce. For example, according to one exemplary embodiment, a glyph 104 may be colored in an anti-reproduction color such as non-photo blue/non-repro blue in order to limit the ability of a counterfeiter to photograph or scan, and then accurately reproduce, a glyph 104. According to another exemplary embodiment, additional features may be added to the glyphs 104, for example halos, dashes, spaces, dots, deliberate imperfections, image "dirt" around a character resembling excess toner or material from a thermal ribbon, or any other such variation. This may likewise be used to increase security; for example, according to one exemplary embodiment, the placement, size, shape, or other attributes of an apparent image imperfection may encode data. Other colors and other variations may also be envisioned.

According to an exemplary embodiment of the design, the standard barcode elements 102 and the 2D barcode 100, including the glyph or symbol 104 ("glyph") may be separately readable. For example, according to one exemplary embodiment, a 2D barcode 100 may be affixed to a particular product. A consumer, having purchased the product, may be able to scan the 2D barcode 100 with a 2D barcode scanning utility, and in doing so may be able to decode certain information encoded in the standard barcode elements 102. This may be, for example, all or part of a unique serial number that may be used to identify the product, or may be other identifying information, as desired. However, the barcode scanning utility available to the consumer may not be able to or may not be configured to decrypt all of the information in the 2D barcode 100, such as information encoded by the glyph 104 or associated with the glyph 104 (such as information encoded in the glyph placement).

For example, according to one exemplary embodiment, a 2D barcode 100 may encode a product serial number that is some number of characters, for example fifteen characters, in length. The glyph 104 may encode some number of those characters, for example two of those characters, based on the type or placement of the glyph. The remaining characters may correspond to a truncated barcode. According to an exemplary embodiment, this truncated barcode may be sufficient to identify the product to the user. However, the glyph 104 portion of the 2D barcode 100 may be used to identify the product to the product seller or manufacturer; if a product was sold with a certain serial number, and only a certain glyph type was associated with that serial number, then the product may be identified—only to the manufacturer—as being counterfeit if the expected glyph 104 does not match the scanned glyph 104. This may ensure that counterfeit products can be identified even if a counterfeiter manages to reverse-engineer the serial number encoding scheme, and may alert the manufacturer as to the locations of products specifically known to be counterfeit instead of products that are merely flagged as potentially counterfeit.

According to an alternative exemplary embodiment of the glyph 104, it may instead encode information related to the entire product label, such as a checksum generated from all or part of the characters on the label. This may include information that may be routinely varied from product to product, such as the product serial number or the sizing information of the product. Other information, such as the placement of the information on the product label, or information that is not on the product label at all, may also be used to compute the checksum and generate the glyph 104.

According to an alternative exemplary embodiment, one or more glyphs 104 may be used in order to identify to the user whether or not their products are counterfeit. According to such an embodiment, the user may input a product serial number or other product identification information related to a specific product into an app or Web form; they may do this, for example, by typing in a product serial number or by scanning a 2D barcode 100. This product identification information may have a specific glyph 104, or specific plurality of glyphs, associated with it; when the user inputs the product identification information, the specific glyph 104 or glyphs associated with that product identification information may be displayed to the user. The user may then be able to verify whether or not the product being sold to them, or the product they have purchased, is an authentic product by determining whether the glyph 104 present on the product they are considering purchasing or have purchased matches any of the glyphs 104 associated with the product identification information that they have input. If the expected and actual glyphs 104 do not match, the user may wish to reconsider their purchase.

Such an embodiment offers a potential disadvantage, in that a counterfeiter who determines how to fake a serial number or the standard barcode elements 102 of a 2D barcode may then "check their work" by sending the manufacturer this product identification information in order to determine the correct glyph 104 or glyphs associated with this information. However, this also has numerous disadvantages for the counterfeiter, as many repeated requests for glyph information, all from the same area, may alert the manufacturer as to the presence of a possible counterfeiting operation in that area—especially if many of the serial numbers queried eventually end up being discovered on counterfeit products.

Turning now to FIGS. 2A-2E, an exemplary embodiment of a product tag lookup system 200 may be disclosed. Beginning with FIG. 2A, a user may first scan a 2D barcode located on a product tag or elsewhere using a product tag lookup utility 202, which may be, for example, a proprietary smartphone app or another such utility. The product tag lookup utility 202 may read the 2D barcode or other product identifying information, which may be decoded and/or displayed to the user. For example, a 2D barcode may be decoded into a product serial number 204A, which may then be displayed to the user as part of a product record. Other product information 206A, such as the sizing or dimensioning of the product, may also be read and/or displayed to the user; this may allow the user to, if desired, verify the authenticity of their product by ensuring that all displayed product information matches the attributes of their product. For example, if the displayed product information 206A makes reference to men's clothing having a US size of 10½, and the article the user has in hand is women's clothing of size 10½, the user will know that they most likely have a counterfeit article.

Figure 2B:
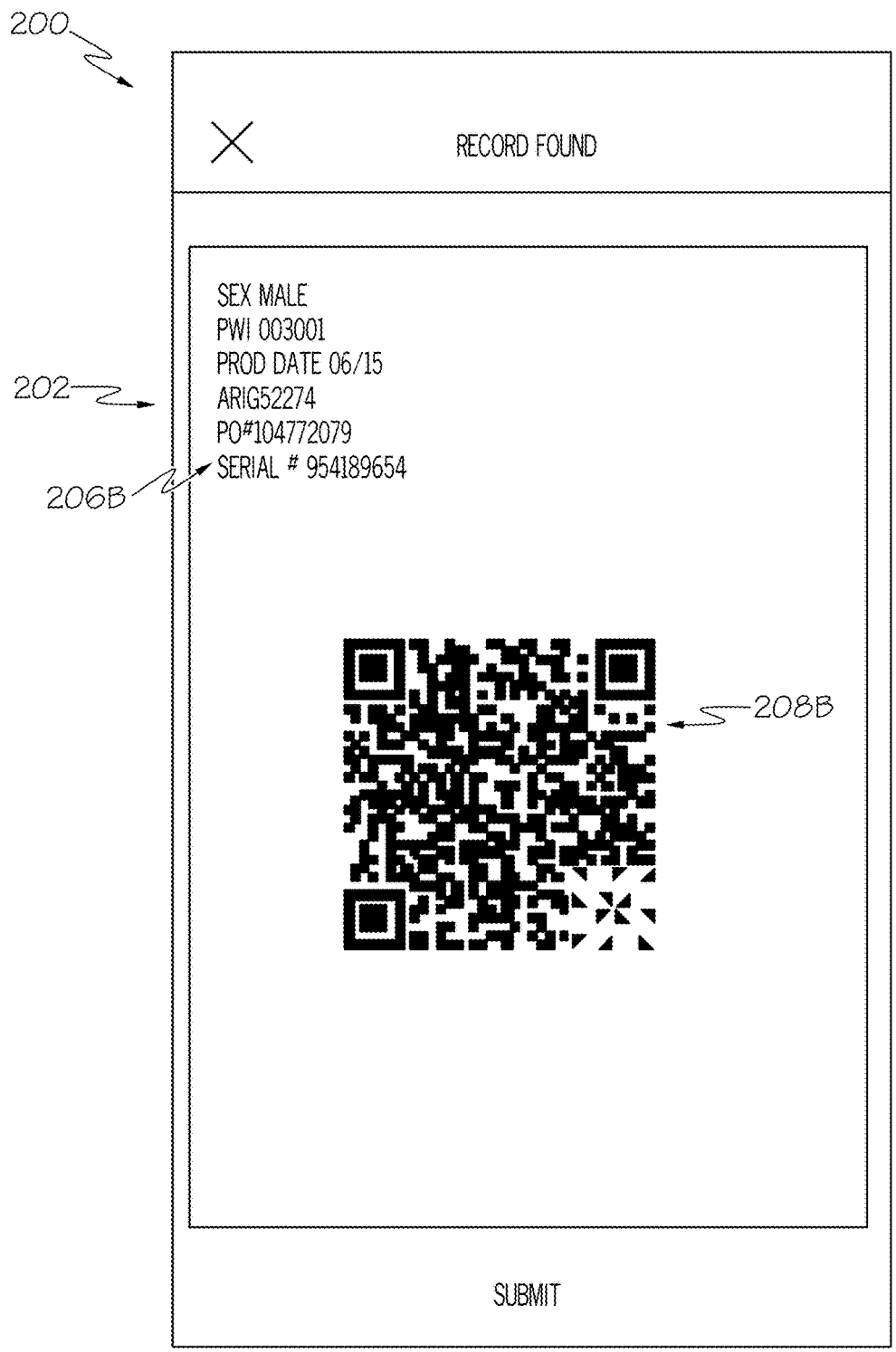
FIG. 2B is an exemplary embodiment of a product tag lookup system.

Turning now to exemplary FIG. 2B, a 2D barcode, once scanned by a user, may also display as product information an accurate depiction of the 2D barcode 208B. This 2D barcode 208B may include any glyphs or other features that are expected to be present in the 2D barcode 208B, and the proper placement and orientation of those glyphs. This may allow a user to screen out potentially counterfeit goods by allowing a user to verify whether the 2D barcode on their product accurately matches the 2D barcode 208B displayed by the product tag lookup utility 202.

Figure 2C:
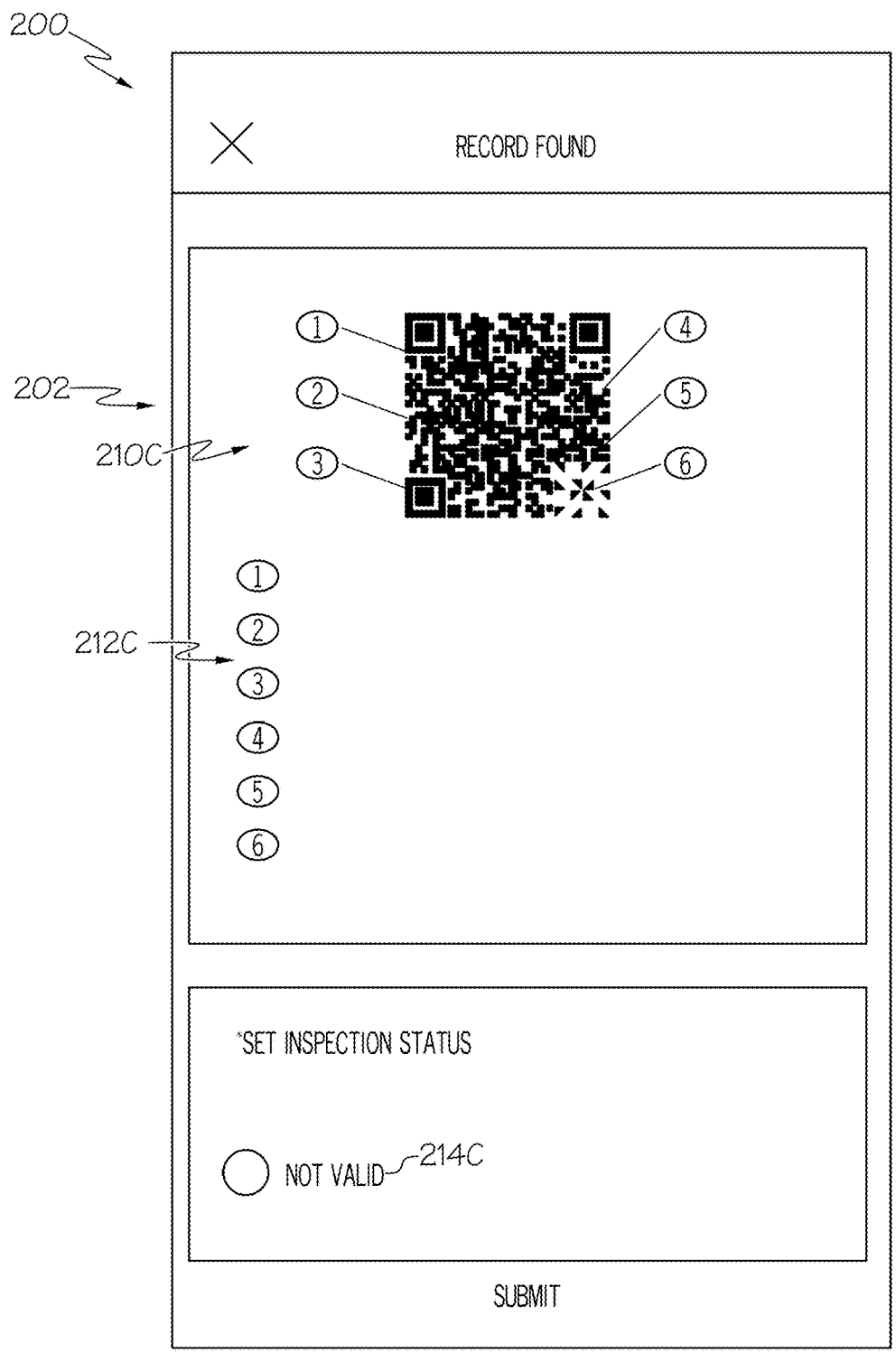
FIG. 2C is an exemplary embodiment of a product tag lookup system.

Turning now to exemplary FIG. 2C, a product tag lookup system 200 may also provide to a product tag lookup utility 202 any other applicable forensic information or other information about a product. For example, a user may be provided with a forensic key displaying an annotated product label 210C and listing various errors commonly made by counterfeiters attempting to reproduce the product label 212C. For example, it may be that a particular line of the product label was created using two different fonts, or an esoteric font, such that counterfeiters attempting to duplicate a particular character or symbol made using one font end up accidentally using the other font. In the exemplary embodiment displayed in FIG. 2C, the orientation of the symbol '#' being other than anticipated may serve as one such "tell" or indication that the product is a counterfeit. Other such traps for the unwary counterfeiter, for example "traps" having to do with the placement or orientation of the 2D barcode, may be used, as desired.

An inspection status utility 214C may also be available to the user. According to the exemplary embodiment where the user is provided with a forensic key, once a user has examined the forensic key, they may be able to mark a particular product as "valid" or "not valid" using the inspection status utility 214C. Other options, such as an option to flag the product for review or an option to provide additional notes, may also be provided.

Turning now to exemplary FIG. 2D, an inspection status utility 214D may include three options: "not valid," "suspect," and "authentic." The "not valid" option may be selected by a user who knows a product to be clearly counterfeit, while the "suspect" option may be checked by a user who suspects a product to be counterfeit but is not certain of that, for example because the irregularities displayed are very minor and may be within factory tolerances for the product. The last option, "authentic," may be selected by a user who knows or can verify that a product to be authentic.

A user may have more options to provide feedback as to the authenticity of a product. For example, the user may have a screen 216D in which they are able to specify whether or not the product forensics match, or may be able to specify which forensics do or do not match or how closely each forensic matches, or any other relevant information. A user may also have another screen available in which they may specify any other details 218D that may be relevant to the product's inspection status, or may have a screen available in which they may provide miscellaneous notes or other text, as desired.

Figure 2E:
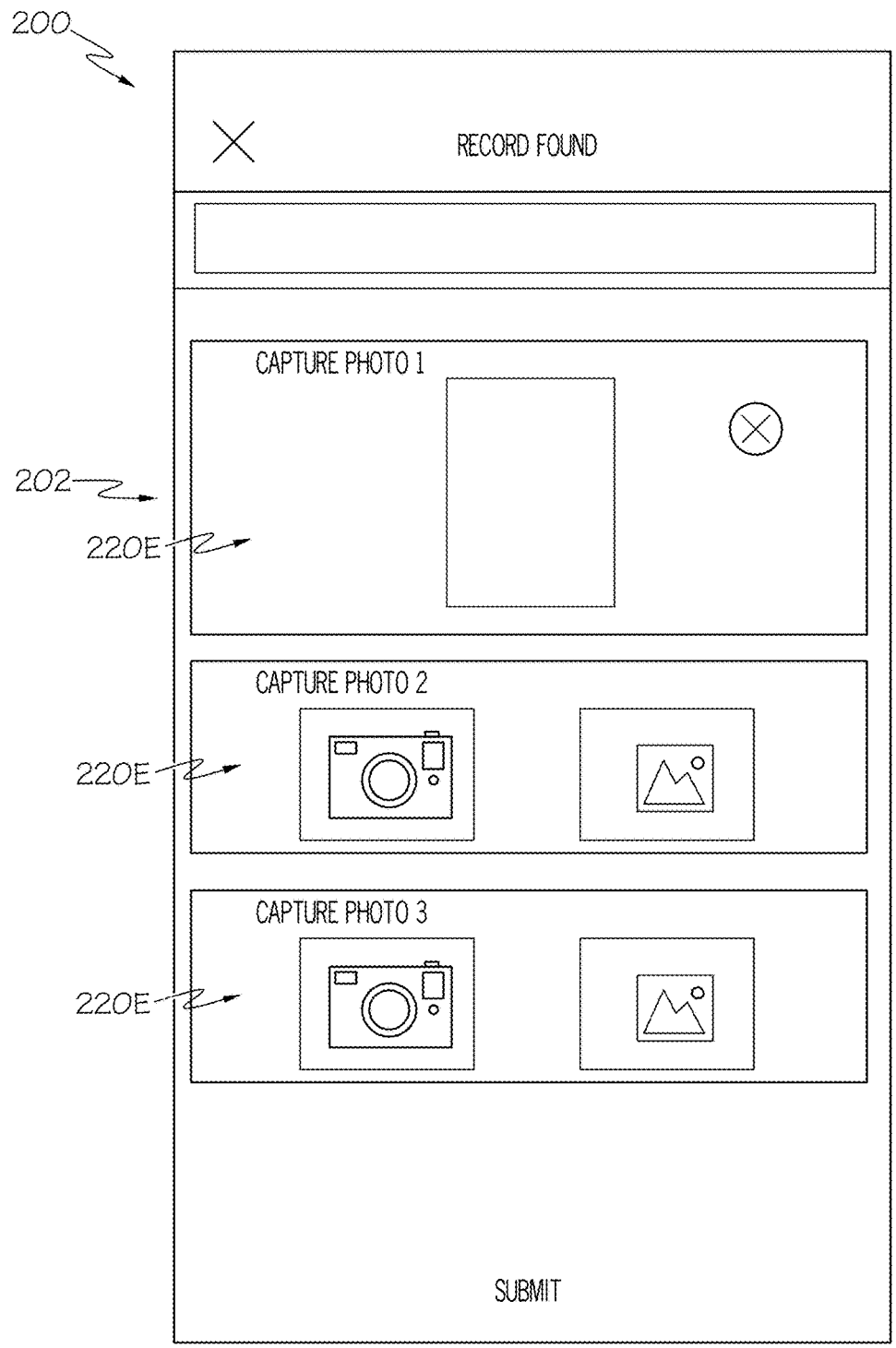
FIG. 2E is an exemplary embodiment of a product tag lookup system.

Turning now to exemplary FIG. 2E, a user may also be able to capture and upload a number of photographic depictions of a product label 220E using the product tag lookup utility 202. This may, by default, include the original image of the product tag, and may also include other depictions of the product tag or of the product itself. For example, according to one exemplary embodiment, the product tag of a counterfeit product may be an accurate reproduction, but the stitching of the counterfeit product may be different from a genuine product, marking it as counterfeit. The user may be able to capture a picture of, and subsequently upload, the stitching in the counterfeit product in order to show evidence of the product's counterfeit status.

Figure 2F:
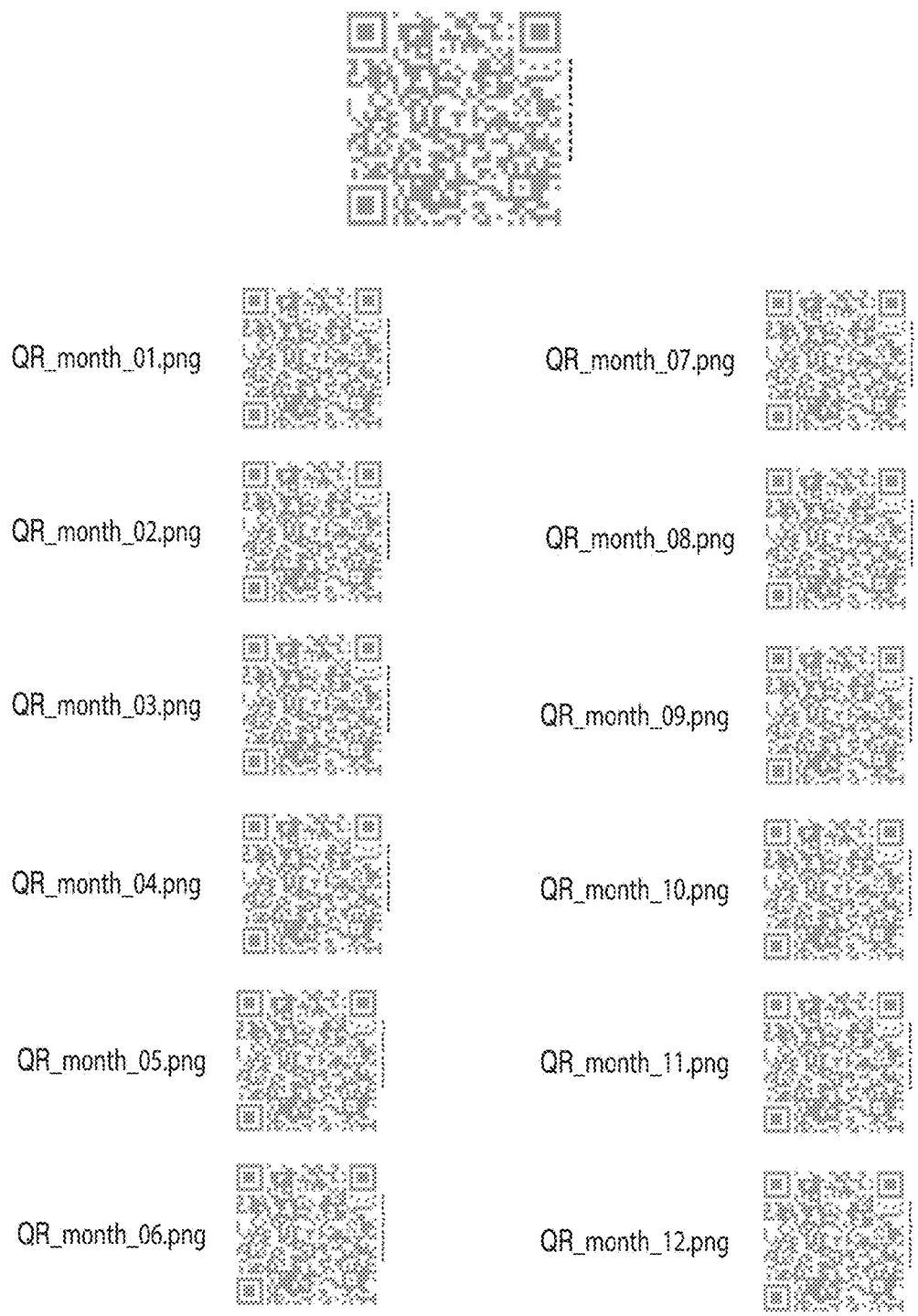
FIG. 2F is an exemplary embodiment of a glyph setup according to the present invention.

FIG. 2F illustrates one embodiment of the present invention in which a dot patterned glyph setup in which the at least one glyph is placed adjacent to a 2D symbol.

In another embodiment of the present invention, the system for forensic encryption presently set forth may be utilized in combination with a second authentication, encryption system which allows for dual authentication functionality. For instance, two different scans could be utilized for further authentication and encryption. In one embodiment, a first scan with a specialized reader, is completed, and then through an automated process, a secondary scan of the 2D bar code and at least one glyph is completed. This allows for the comparison of the forensics between the first image and the bar code and at least one glyph. The present invention contemplates that the first scan, scans a particular image that may be separate from the barcode and at least one glyph. That particular image could be a watermark or other type of optical image like scrambled indicia or technology that senses when particular chemicals are present. The image may be incorporated within the 2D barcode or at least one glyph or separate from both completely. By utilizing a system with dual authentication functionality, the system becomes more automated and relies less on a user's judgment.

In one embodiment of the present invention, wherein the 2D barcode pattern including the at least one glyph may be decoded by a second 2D barcode scanner to yield different product information.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art; for example, features associated with certain configurations of the invention may instead be associated with any other configurations of the invention, as desired.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system for forensic encryption, comprising:
a 2D barcode pattern comprising a plurality of 2D barcode elements printed in a region on a printable surface, and which is affixed to a unique product; and
at least one glyph printed within an area of the 2D barcode pattern; and
wherein the 2D barcode elements are decoded by a first 2D barcode scanner to yield the at least one glyph, and wherein the at least one glyph is decoded by a user to verify the at least one glyph.

2. The system of claim 1, wherein the at least one glyph is generated from a product serial number associated with the unique product.

3. The system of claim 2, wherein the at least one glyph is generated from certain characters of the product serial number available to a manufacturer, and wherein an altered product serial number not including the characters used to generate the at least one glyph is affixed to the unique product.

4. The system of claim 3, wherein the altered product serial number is encoded in a form of a plurality of standard 2D barcode elements.

5. The system of claim 1, wherein the unique product has a product tag having a plurality of printed characters, and wherein the at least one glyph is generated as a checksum of at least one of said printed characters.

6. The system of claim 1, wherein the at least one glyph is rotated before placement, and wherein the degree of rotation of the glyph encodes product information.

7. The system of claim 1, wherein an apparent imperfection comprising at least one of a set of halos, dashes, spaces, dots, and deliberate imperfections around a character resembling one of excess toner or material from a thermal ribbon is added to the at least one glyph.

8. The system of claim 7, wherein the apparent imperfection encodes product information.

9. The system of claim 1, wherein the at least one glyph is printed in an anti-reproduction color.

10. A printer-implemented method for printing a forensic-encoded 2D barcode, comprising:
storing, in a storage module of a printer, one or more fonts including glyphs to be printed within the forensic-encoded 2D barcode;
receiving, from a computer, instructions to print the forensic-encoded 2D barcode including one or more glyphs, said instructions not including the one or more glyphs to be printed;
accessing, from the storage module of the printer and using a processor, one or more fonts including glyphs to be printed within the forensic-encoded 2D barcode;
selecting, using the processor, one or more glyphs to be added to the forensic-encoded 2D barcode;
generating, from said instructions and using the processor, a forensic-encoded 2D barcode including one or more selected glyphs; and
printing the forensic-encoded 2D barcode.

11. The method of claim 10, further comprising:
selecting an apparent imperfection comprising at least one of a set of halos, dashes, spaces, dots, deliberate imperfections, and image "dirt" around a character resembling excess toner or material from a thermal ribbon, and adding the apparent imperfection to one or more selected glyphs.

12. The method of claim 10, wherein the one or more fonts stored on the storage module of a printer are not stored in a storage module of any computer operationally connected to the printer.

13. A system for forensic encryption, comprising:
a 2D barcode pattern comprising a plurality of 2D barcode elements printed in a region on a printable surface, and which is affixed to a unique product; and
at least one glyph printed within an area of the 2D barcode pattern;
wherein the at least one glyph is generated from information identifying the unique product; and
wherein an image is scanned by a first scanner to yield first information, and wherein the 2D barcode pattern including the at least one glyph are decoded by a second scanner to yield second information such that the first information and second information are compared to one another.

* * * * *